(12) United States Patent
Erb et al.

(10) Patent No.: US 9,901,760 B2
(45) Date of Patent: Feb. 27, 2018

(54) AIR DELIVERY SYSTEM HAVING ADJUSTABLE FLAME-BLOCKING FILTERS

(71) Applicant: Nortek Air Solutions Canada, Inc., Saskatoon (CA)

(72) Inventors: Blake Norman Erb, Warman (CA); Stephen Harold Hanson, Saskatoon (CA); Mohammad Afshin, Saskatoon (CA)

(73) Assignee: Nortek Air Solutions Canada, Inc., Saskatoon (CA)

( * ) Notice: Subject to any disclaimer, the term of this patent is extended or adjusted under 35 U.S.C. 154(b) by 605 days.

(21) Appl. No.: 14/047,497

(22) Filed: Oct. 7, 2013

(65) Prior Publication Data

US 2014/0273799 A1    Sep. 18, 2014

Related U.S. Application Data

(60) Provisional application No. 61/784,686, filed on Mar. 14, 2013.

(51) Int. Cl.
*A62C 2/06* (2006.01)
*F24F 12/00* (2006.01)

(52) U.S. Cl.
CPC ............ *A62C 2/065* (2013.01); *F24F 12/006* (2013.01); *Y02B 30/563* (2013.01)

(58) Field of Classification Search
CPC ..................................................... A62C 2/06
USPC ........................................................ 454/257
See application file for complete search history.

(56) References Cited

U.S. PATENT DOCUMENTS

| | | | | |
|---|---|---|---|---|
| 2,279,791 A * | 4/1942 | Lamb | ............................... | 169/48 |
| 3,976,825 A * | 8/1976 | Anderberg | .................... | 174/151 |
| 4,093,818 A * | 6/1978 | Thwaites et al. | ............. | 174/505 |
| 5,869,010 A * | 2/1999 | Langer | ........................ | 422/179 |
| 5,870,197 A * | 2/1999 | Sogard | ............... | G03F 7/70716 355/30 |
| 6,130,381 A * | 10/2000 | Keith et al. | .............. | 174/17 VA |
| 6,360,502 B1 | 3/2002 | Stahl | | |
| 6,752,714 B1 * | 6/2004 | Mann | ............................ | 454/369 |
| 7,413,024 B1 * | 8/2008 | Simontacchi et al. | .......... | 169/48 |
| 7,575,617 B2 * | 8/2009 | Ferguson | ........................ | 55/480 |
| 7,685,792 B2 | 3/2010 | Stahl | | |
| 7,785,544 B2 | 8/2010 | Alward | | |

(Continued)

FOREIGN PATENT DOCUMENTS

GB          2159051 A    * 11/1985         ............... A62C 3/14

*Primary Examiner* — Steven B McAllister
*Assistant Examiner* — Samantha Miller
(74) *Attorney, Agent, or Firm* — Schwegman Lundberg & Woessner, P.A.

(57) ABSTRACT

An air delivery system is configured to deliver air to an enclosed structure and may include at least one air channel configured to deliver air to or receive air from the enclosed structure, at least one component disposed within the at least one air channel, and at least one flame-blocking filter removably and adjustably secured within the at least one air channel. The at least one flame-blocking filter is configured to isolate the at least one component from a source of excessive temperature or flames. The at least one flame-blocking filter is configured to allow air to pass therethrough under normal operating conditions, and to block air and flames from passing therethrough when exposed to the excessive temperature or the flames.

9 Claims, 9 Drawing Sheets

(56) References Cited

U.S. PATENT DOCUMENTS

| | | |
|---|---|---|
| 7,887,898 B1 | 2/2011 | Schmutter |
| 8,517,809 B2 * | 8/2013 | Wexler .......................... 454/277 |
| 2004/0054035 A1 | 3/2004 | Hallissy |
| 2004/0072538 A1 * | 4/2004 | Kennedy et al. ............. 454/342 |
| 2008/0220714 A1 * | 9/2008 | Caruso et al. ................ 454/365 |
| 2008/0248739 A1 * | 10/2008 | Carlson et al. ............... 454/369 |
| 2009/0148660 A1 | 6/2009 | Cooper |
| 2010/0051615 A1 | 3/2010 | Bowman |
| 2013/0068104 A1 | 3/2013 | Brown |
| 2013/0217318 A1 * | 8/2013 | Edwards et al. .............. 454/366 |

* cited by examiner

AIR DELIVERY SYSTEM HAVING ADJUSTABLE FLAME-BLOCKING FILTERS

CROSS-REFERENCE TO RELATED APPLICATIONS

The present application relates to and claims priority benefits from U.S. Provisional Patent Application No. 61/784,686, entitled "Flame Filter For a Heating, Ventilation, and Air Conditioning (HVAC) System," filed Mar. 14, 2013, which is hereby expressly incorporated by reference in its entirety.

BACKGROUND OF THE DISCLOSURE

Embodiments of the present disclosure generally relate to air delivery systems, such as HVAC, air handling, heat pump, and energy exchange systems, and, more particularly, to air delivery systems having one or more removable and/or adjustable flame-blocking filters.

Currently, Heating, Ventilation, and Air Conditioning (HVAC) systems are certified with respect to Underwriters Laboratories Standard UL1995 in order to prove that they do not pose a significant risk of causing or enhancing a fire. In general, UL1995 certification is required for most, if not all, building codes. In order for a HVAC unit to be UL1995 certified, many of the components in the HVAC unit are required to pass various UL tests. For example, beginning in October 2014, all air-to-air energy recovery devices and filters will be required to pass Standard UL900. The new requirement for the HVAC components to pass UL900 poses a challenge, as certain HVAC components may traditionally be combustible, and UL900 represents a stringent test. During the UL900 test, a component is subjected to a direct flame for 3 min, and smoke generation and flammability is observed.

One approach to pass the UL900 Standard, or other flame tests, is to build a particular component from flame-resistant materials. Such materials may include metals, or materials with flame-resistant properties or additives, such as flame-resistant plastics. In general, flame resistant plastics are more expensive than standard plastics such as, but not limited to, polypropylene, polyethylene, and acrylonitrile butadiene styrene (ABS). However, constructing HVAC components out of special flame-resistant materials is challenging and may be more expensive than using standard materials.

SUMMARY OF THE DISCLOSURE

Certain embodiments of the present disclosure provide a flame-blocking filter configured to be used with an air delivery system. The flame-blocking filter may include an outer frame and an intumescent filter member. The outer frame is configured to be removably and adjustably inserted into at least one channel of the air delivery system. The outer frame defines an air opening such that air flows through the air opening during normal operation of the air delivery system. The intumescent filter member may be secured to the outer frame and may include beams crossing the air opening in at least one direction. The beams are spaced apart to provide a plurality of air passages configured to allow air to flow therethrough during the normal operation of the air delivery system. The intumescent filter member has a first thickness when in an inactive non-heated state. The intumescent material is configured to expand to a greater second thickness when in an active heated state. The intumescent material closes the plurality of air passages when in the active heated state, and provides an insulated barrier that protects downstream components from flames and heat.

The intumescent filter member may include one or more of a mesh, grid, lattice, one or more sheets, one or more panels, or foam material. The mesh, grid, lattice, one or more sheets, one or more panels, or foam material may be formed of an intumescent material. In at least one other embodiment, the mesh, grid, lattice, one or more sheets, one or more panels, or foam material may be formed of one or more of metal or plastic that is coated, painted, or sprayed with an intumescent material.

The beams may be arranged in one of a horizontal alignment, a vertical alignment, a checker pattern, or a mesh. Each of the plurality of air passages may be shaped as a rectangle, square, circle, oval, hexagon, or polygon.

The outer frame may include one or more features configured to be slidably retained by at least one track of the air delivery system, or vice versa. In at least one embodiment, the outer frame is formed of or coated with an intumescent material. The outer frame may also be configured to hold multiple intumescent filter members. In at least one embodiment, the filter members may be rotated to form a movable damper, for example. In such an embodiment, the filter damper may be actuated based on smoke detection, heat detection, power failure, and the like.

Certain embodiments of the present disclosure provide an air delivery system configured to deliver air to an enclosed structure. The air delivery system may include at least one air channel configured to deliver air to or receive air from the enclosed structure; at least one component disposed within the at least one air channel, and at least one flame-blocking filter removably and adjustably secured within the at least one air channel. The flame-blocking filter(s) is configured to isolate the component(s) from a source of excessive temperature or flames. The flame-blocking filter(s) is configured to allow air to pass therethrough under normal operating conditions, and to block air and flames from passing therethrough when exposed to the excessive temperature or the flames.

The flame-blocking filter(s) is configured to be adjusted within the air channel(s) over a distance with respect to the at least one component. The flame-blocking filter(s) is separated from the component(s) within the air channel(s) by a distance.

The component(s) may include one or more of an energy exchanger, fan, motor, energy recovery device, condenser, evaporator, control unit, or electronics panel, for example.

Figure 1:
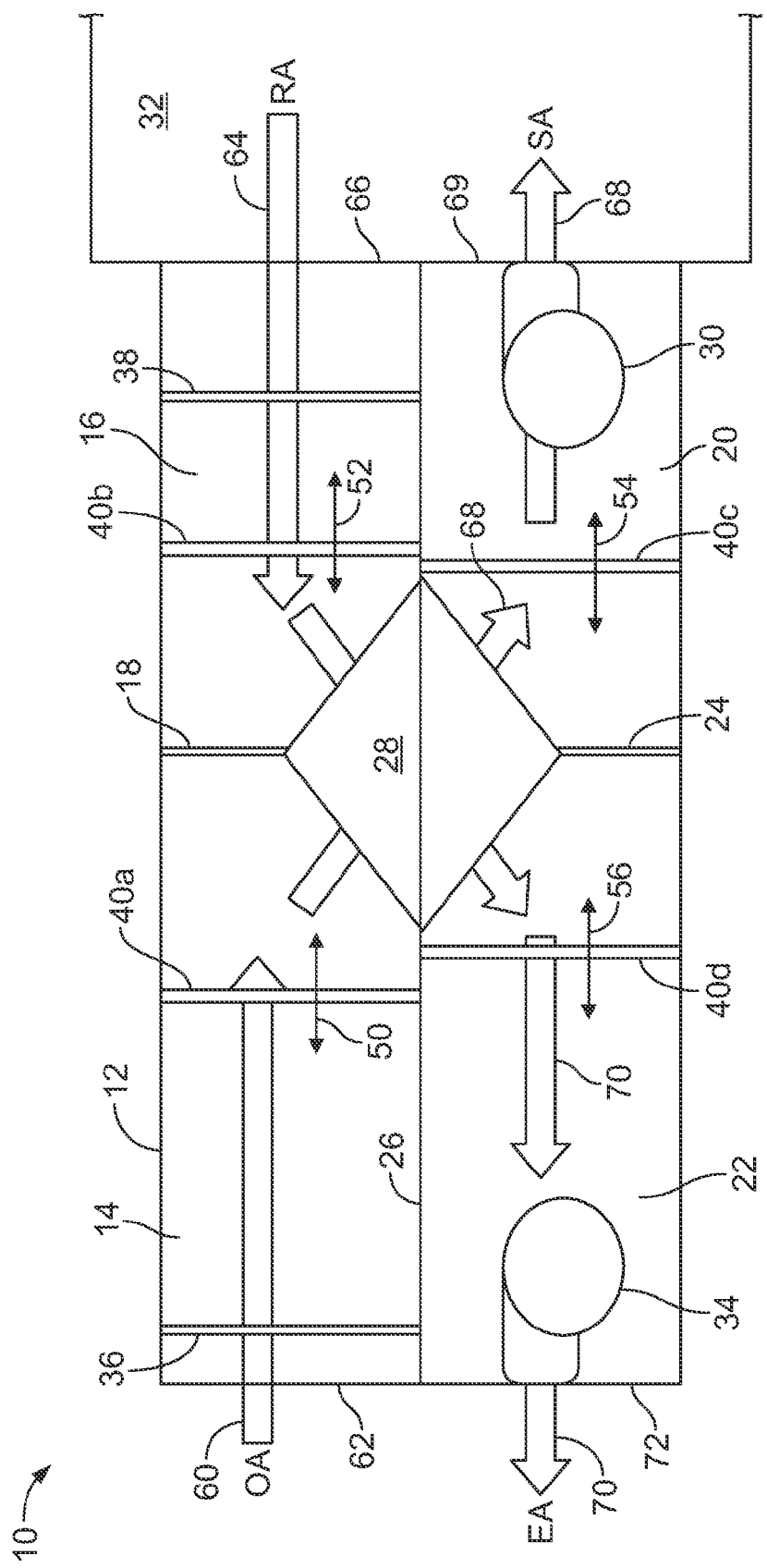
FIG. 1 illustrates a schematic of an air delivery system in a first configuration, according to an embodiment of the present disclosure.

Before the embodiments are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE DISCLOSURE

FIG. 1 illustrates a schematic view of an air delivery system 10 in a first configuration, according to an embodiment of the present disclosure. The air delivery system 10 includes a housing 12, which may include an outside air inlet channel 14 separated from a return air inlet channel 16 by a partition 18. The housing 12 may also include a supply air outlet channel 20 separated from an exhaust air outlet channel 22 by a partition 24. The outside air inlet channel 14 and the return air inlet channel 16 may be separated from the exhaust air outlet channel 22 and the supply air outlet channel 20, respectively, by a central partition 26 that may be perpendicular to the partitions 18 and 24.

An energy exchanger 28 may be disposed within the housing 12 at the junction of the partitions 18, 24, and 26. The energy exchanger 28 may be a plate heat exchanger, enthalpy or desiccant wheel, heat pipe, or the like. A supply air fan 30 may be disposed within the supply air outlet channel 20 downstream from the energy exchanger 28, and is configured to draw air into an enclosed space 32 that is in communication with the supply air outlet channel 20. Alternatively, the supply air fan 30 may be disposed at various other areas within the housing 12, such as, for example, upstream from the energy exchanger 28 within the outside air inlet channel 14. Additionally, more than one supply air fan 30 may be used. Similarly, an exhaust air fan 34 may be disposed within the exhaust air outlet channel 22 downstream from the energy exchanger 28, and is configured to draw air from the enclosed space 32, which is also in communication with the return air inlet channel 16. Alternatively, the exhaust air fan 34 may be disposed at various other areas within the housing 12, such as, for example, upstream from the energy exchanger 28 within the return air outlet channel 16. Further, more than one exhaust air fan 34 may be used.

An air filter 36 may be disposed within the outside air inlet channel 14 upstream from the energy exchanger 28. Similarly, an air filter 38 may be disposed within the return air outlet channel 16 upstream from the energy exchanger 28. The air filters 36 and 38 may be configured to filter impurities, bacteria, and the like from the air streams. The air filters 36 may be located at various other locations within the housing 12. Additionally, more or less air filters may be used. Alternatively, the air delivery system 10 may not include any air filters.

In operation, outside air 60 passes into an inlet 62 of the outside air inlet channel 14. As the outside air 60 passes through the energy exchanger 28, the outside air 60 exchanges one or both of sensible and latent energy with return air 64 from the enclosed structure 32 that passes into the energy exchanger 28 by way of an inlet 66 of the return air inlet channel 16. The outside air 60 is conditioned within the energy exchanger 28 by the return air 64 within the energy exchanger 28, which is simultaneously modulated by the outside air 60 within the energy exchanger 28. The conditioned outside air 60 passes out of the energy exchanger 28 as supply air 68, which is then supplied to the enclosed structure 32 by way of an outlet 69 of the supply air outlet channel 20. Also, the modulated return air 64 passes out of the energy exchanger 28 as exhaust air 70, which is exhausted out of the housing 12 through an outlet 72 of the exhaust air outlet channel 22.

In order to protect the energy exchanger 28 from excessive heat and flames, flame-blocking filters 40a, 40b, 40c, and 40d are removably and adjustably secured within the housing 12. For example, a flame-blocking filter 40a is removably and adjustably secured within the outside air inlet channel 14 upstream of the energy exchanger 28 and downstream from the air filter 36. Similarly, a flame-blocking filter 40b is removably and adjustably secured within the return air inlet channel 16 upstream from the energy exchanger 28 and downstream from the air filter 38. Further, a flame blocking filter 40c is removably and adjustably secured within the supply air outlet channel 20 downstream from the energy exchanger 28 and upstream from the supply air fan 30. Also, a flame blocking filter 40d is removably and adjustably secured within the exhaust air outlet channel 22 downstream from the energy exchanger 28 and upstream from the exhaust air fan 34. As such, the energy exchanger 28 is protected from excessive heat and flame in all four of the outside air inlet channel 14, the return air inlet channel 16, the supply air outlet channel 20, and the exhaust air outlet channel 22. The energy exchanger 28 is isolated from any fire or excessive temperatures (such as those exceeding 150° F.) that may be present on opposite sides of the flame-blocking filters 40a, 40b, 40c, and 40d.

Notably, the flame-blocking filters 40a, 40b, 40c, and 40d may not be directly fixed or otherwise secured directly to the energy exchanger 28. For example, none of the flame-blocking filters 40a, 40b, 40c, and 40d may form any part of the energy exchanger 28, nor may they be directly fixed thereto, such as through fasteners. Instead, the flame-blocking filters 40a, 40b, 40c, and 40d are removably secured within the housing 12. For example, each flame-blocking filter 40a, 40b, 40c, and 40d may be removed, replaced, and adjusted within the housing. Each flame-blocking filter 40a, 40b, 40c, and 40d may be adjustably secured with respect to a distance in relation to the energy exchanger 28. For example, the flame-blocking filter 40a may be adjustably moved toward or away from the energy exchanger 28 within the outside air inlet channel 14 in the directions denoted by arrow 50. Similarly, the flame-blocking filter 40b may be adjustably moved toward or away from the energy exchanger 28 within the return air inlet channel 16 in the directions denoted by arrow 52. Further, the flame-blocking filter 40c may be adjustably moved toward or away from the energy exchanger 28 within the supply air outlet channel 20 in the directions of arrow 54. Also, the flame-blocking filter 40d may be adjustably moved toward or away from the energy exchanger 28 within the exhaust air outlet channel 22 in the directions of arrow 56. As such, each flame-blocking filter 40a, 40b, 40c, and 40d may be spaced at a desired distance from the energy exchanger 28 to provide a tailored fire resistant barrier that protects the energy exchanger 28. As the fire-blocking filters 40a, 40b, 40c, and 40d are moved closer to the energy exchanger 28, the fire-blocking filters 40a, 40b, 40c, and 40d protect the energy exchanger 28 from fire over an increased distance within each channel 14, 16, 20, and 22. However, as the fire-blocking filters 40a, 40b, 40c, and 40d are moved closer to the energy exchanger 28, there may be less intervening air volume to dissipate heat. As such, each fire-blocking filter 40a, 40b, 40c, and 40d may be adjusted based on a desired fire-resistant distance and heat-dissipating distance within each respective channel 14, 16, 20, and 22, respectively.

As explained below, each fire-blocking filter 40a, 40b, 40c, and 40d may be formed from, and/or coated with, an intumescent material. An intumescent material swells when exposed to heat. Thus, when the intumescent material is exposed to heat, it may increase in volume and decrease in density. In general, when exposed to heat, the intumescent material may produce a char. In operation, the fire-blocking filters 40a, 40b, 40c, and 40d may include air passages defined between intumescent filter members, such as frames, beams, ribs, mesh, and the like. At normal operating temperatures, air passes through the air passages. However, when exposed to high temperatures, such as those exceeding 150° F., or direct flames, the intumescent filter members swell and/or char, and, in the process, expand into the air passages, thereby closing the air passages. In this manner, the fire-blocking filters 40a, 40b, 40c, and 40d prevent air and fire from passing into the energy exchanger 28.

Figure 2:
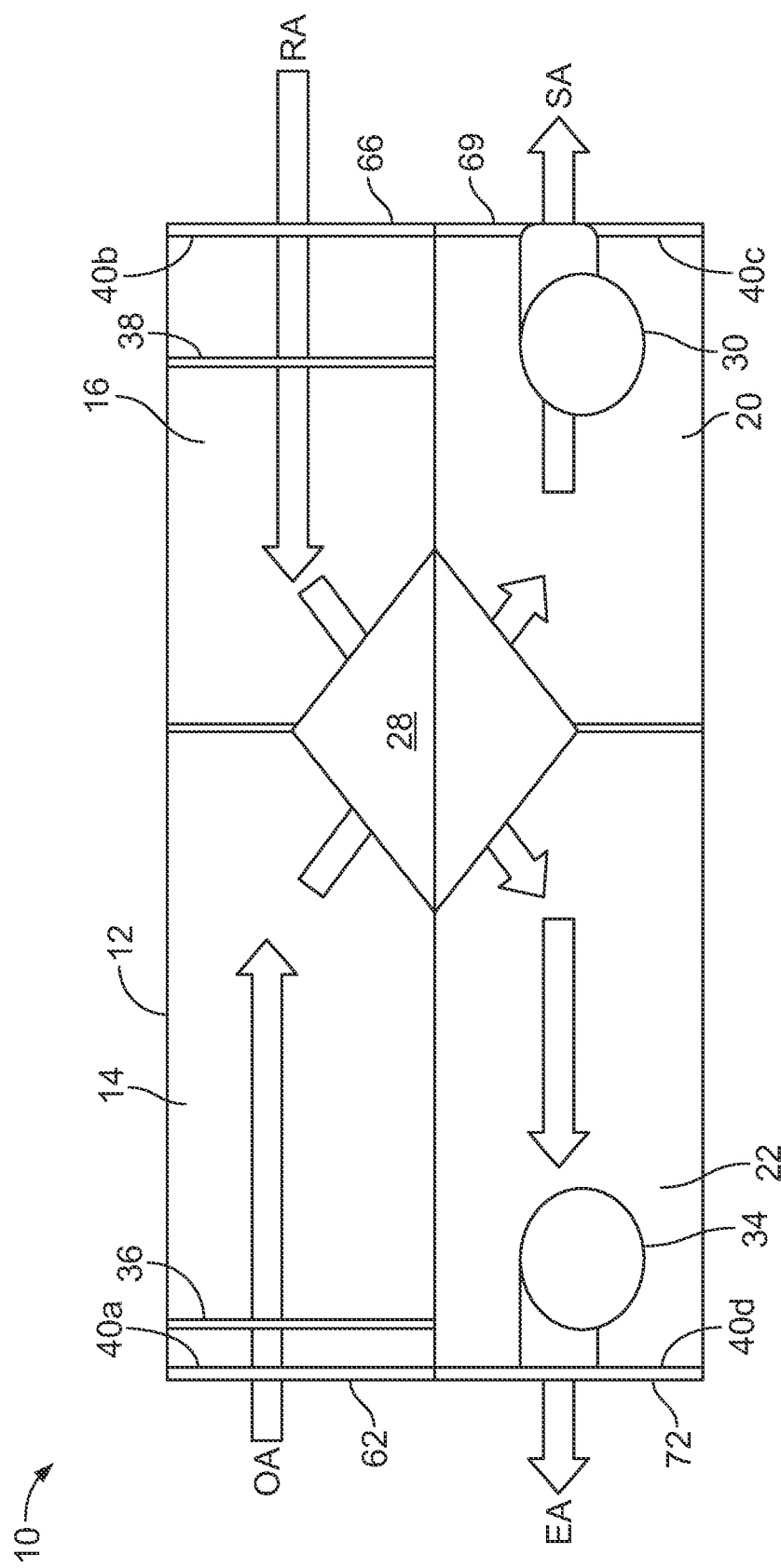
FIG. 2 illustrates a schematic of an air delivery system in a second configuration, according to an embodiment of the present disclosure.

FIG. 2 illustrates a schematic of the air delivery system 10 in a second configuration, according to an embodiment of the present disclosure. As shown in FIG. 2, the flame-blocking filter 40a has been moved proximate to the inlet 62 of the outside air inlet channel 14, while the flame-blocking filter 40b has been moved proximate to the inlet 66 of the return air inlet channel 16. Similarly, the flame-blocking filter 40c has been moved proximate to the outlet 69 of the supply air outlet channel 20, while the flame-blocking filter 40d has been moved proximate to the outlet 72 of the exhaust air outlet channel 22. As such, the flame-blocking filters 40a, 40b, 40c, and 40d may be adjustably moved and positioned at the inlet 62, inlet 66, outlet 69, and outlet 72, respectively, of the housing 12. A maximum intervening distance exists between the energy exchanger 28 and the flame-blocking filters 40a, 40b, 40c, and 40d, which provides maximum air volume that allows heat to dissipate between the flame-blocking filters 40a, 40b, 40c, and 40d. While fire that ignites between the flame-blocking filters 40a, 40b, 40c, and 40d and the energy exchanger 28 may directly contact the energy exchanger 28, the flame-blocking filters 40a, 40b, 40c, and 40d may swell and char when exposed to the heat and/or flames of the fire, thereby preventing additional air from entering into the channels 14, 16, 20, and 22, thereby cutting off further fuel for the fire. Further, each of the flame-blocking filters 40a, 40b, 40c, and 40d may be adjustably positioned closer to the energy exchanger.

Figure 3:
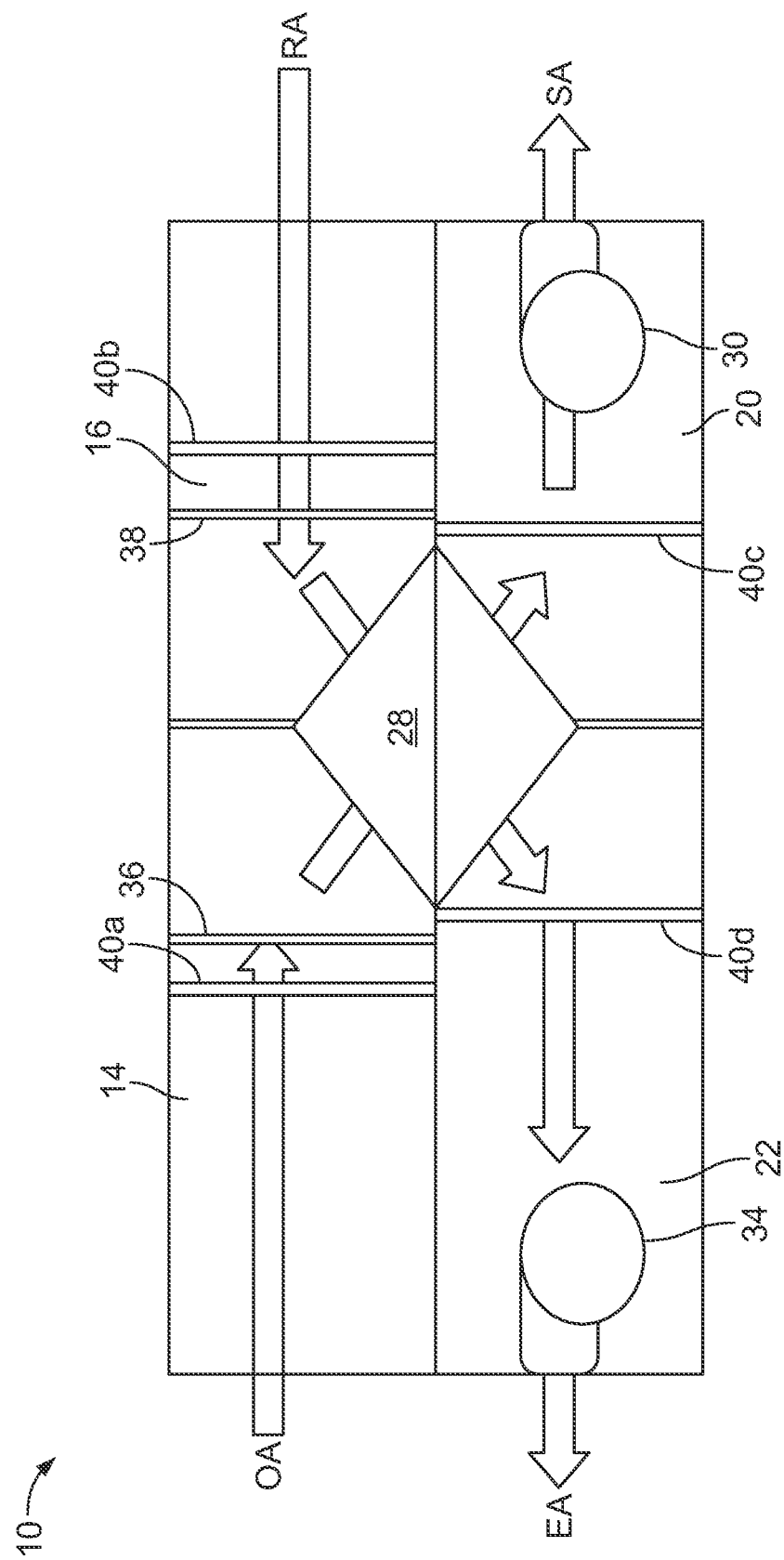
FIG. 3 illustrates a schematic of an air delivery system in a third configuration, according to an embodiment of the present disclosure.

FIG. 3 illustrates a schematic of the air delivery system 10 in a third configuration, according to an embodiment of the present disclosure. As shown, the flame-blocking filter 40a may be adjusted within the outside air inlet channel 14 so that the air filter 36 is disposed between the flame-blocking filter 40a and the energy exchanger 28. Similarly, the flame-blocking filter 40b may be adjusted within the return air inlet channel 16 to that the air filter 38 is disposed between the flame-blocking filter 40b and the energy exchanger 28.

In general, the flame-blocking filters 40a, 40b, 40c, and 40d may be adjusted to any area within the respective channels 14, 16, 20, and 22, respectively. While each flame-blocking filter 40a, 40b, 40c, and 40d may be adjusted to an abutting relationship with the energy exchanger 28, none of the flame-blocking filters 40a, 40b, 40c, and 40d form any part of the energy exchanger 28. Further, none of the flame-blocking filters 40a, 40b, 40c, and 40d may be directly affixed to the energy exchanger 28, such as through fasteners, adhesives, and the like. Alternatively, one or more of the flame-blocking filters 40a, 40b, 40c, and 40d may be directly secured to the energy exchanger 28.

Alternatively, more or less flame-blocking filters may be used within the air delivery system 10. For example, each channel 14, 16, 20, and 22 may include one or more flame-blocking filters that are removably and adjustably secured therein. Optionally, not all of the channels 14, 16, 20, and 22 may retain a flame-blocking filter. For example, the flame-blocking filter 40d may be removed from the exhaust air outlet channel 22.

Figure 4:
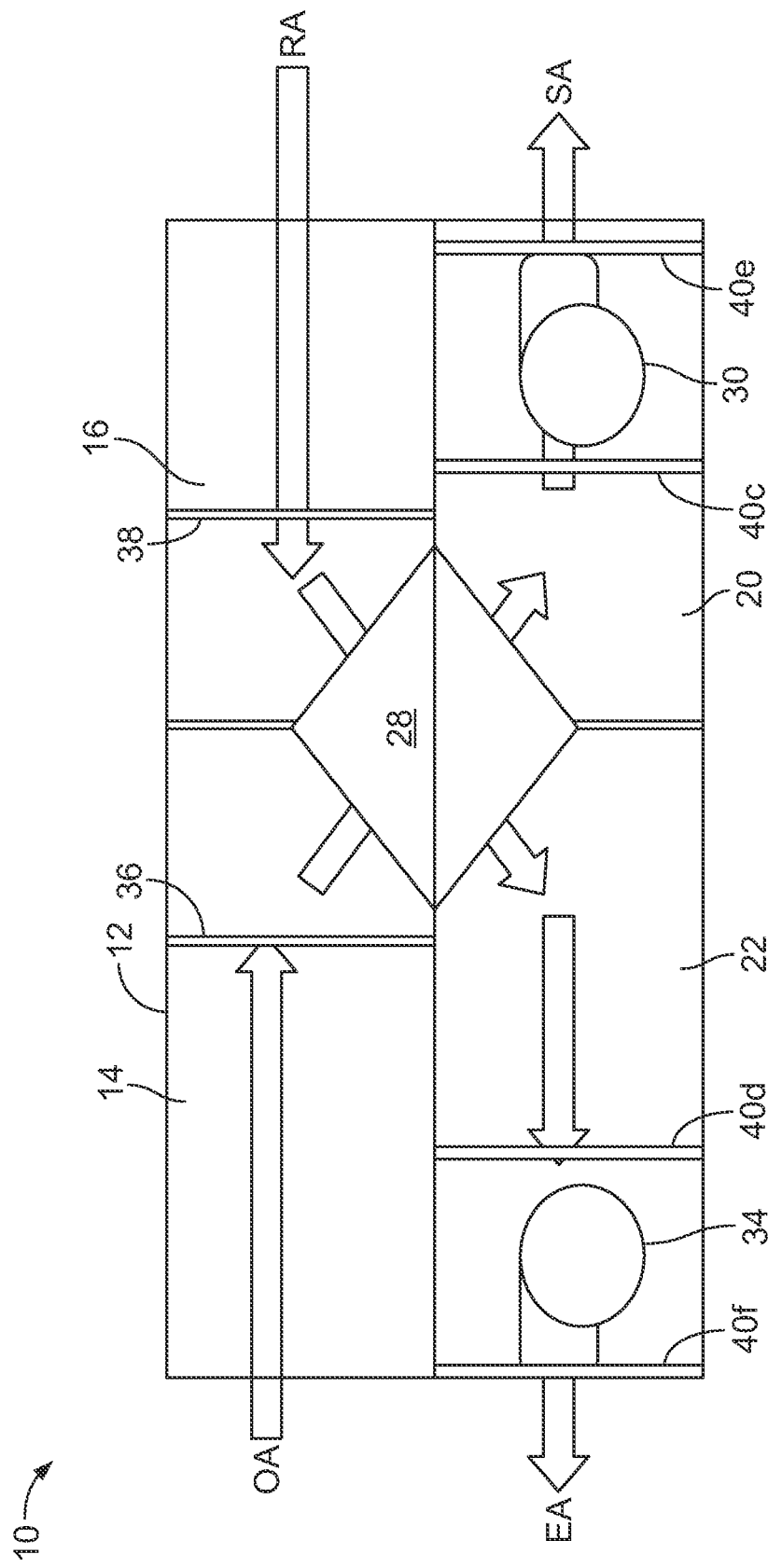
FIG. 4 illustrates a schematic of an air delivery system in a fourth configuration, according to an embodiment of the present disclosure.

FIG. 4 illustrates a schematic of the air delivery system 10 in a fourth configuration, according to an embodiment of the present disclosure. As shown in FIG. 4, the flame-blocking filters 40a and 40b (shown in FIGS. 1-3) have been removed from the channels 14 and 16, respectively. Also, a flame-blocking filter 40e has been added within the channel 20 downstream from the supply fan 30. As such, the supply fan 30 is protected on both sides within the channel 20 by the flame-blocking filters 40c and 40e. Similarly, a flame-blocking filter 40f has been added within the channel 22 downstream from the exhaust fan 34. Therefore, the exhaust fan 34 is protected on both sides within the channel 22 by the flame-blocking filters 40d and 40f.

As shown in FIGS. 1-4, the air delivery system 10 is configured such that air streams cross each other within the energy exchanger 28 at the junction of the partitions 18, 24, and 26. Alternatively, the air delivery system 10 may be configured such that the outside air inlet channel 14 directly and linearly connects to the supply air outlet channel 20, and the return air inlet channel 16 directly and linearly connects to the exhaust air outlet channel 22. In this manner, an air stream that enters the housing 12 through the outside air inlet channel 14 and is supplied to the enclosed structure 32 through the supply air outlet channel 20 may flow parallel (although in an opposite direction) to an air stream that enters the housing 12 through the return air channel 16 and is exhausted through the exhaust air outlet channel 22.

It is to be understood that the flame-blocking filters 40a, 40b, 40c, 40d, 40e, and 40f may be used to isolate various components within an air delivery system from high temperatures and fires. For example, while not shown in FIGS. 1-4, the flame-blocking filters 40a, 40b, 40c, 40d, 40e, and 40f may be used to isolate condensers, evaporators, heat exchange coils, electronics, control systems, energy recovery wheels, motors, electrical panels, and the like.

The air delivery system 10 may be, for example, an HVAC system, a heat pump, an air handling system, an air-to-air energy exchange system, a liquid-to-air energy exchange system, and the like. For example, embodiments of the present disclosure may be used with respect to heat pumps, such as described in U.S. patent application Ser. No. 13/350,902, entitled "Heat Pump System Having a Pre-Processing Module," filed Jan. 16, 2012, U.S. patent application Ser. No. 13/009,222, entitled "Heat Pump System Having a Pre-Processing Module," filed Jan. 19, 2011, U.S. patent application Ser. No. 12/870,545, entitled "Heat Pump Humidifier and Dehumidifier System and Method," filed Aug. 27, 2010, and U.S. patent application Ser. No. 13/275,633, entitled "Heat Pump Humidifier and Dehumidifier System and Method," filed Oct. 18, 2011, all of which are hereby incorporated by reference in their entireties. Also, embodiments of the present discloses may be used with respect to energy exchange systems, such as described in U.S. patent application Ser. No. 13/702,596, entitled "Liquid-To-Air Membrane Energy Exchanger," filed Dec. 7, 2012, U.S. patent application Ser. No. 13/449,598, entitled "Energy Exchange System for Conditioning Air in an Enclosed Structure," filed Apr. 18, 2012, and U.S. patent application Ser. No. 13/737,472, entitled "System and Method for Providing Conditioned Air to an Enclosed Structure," filed Jan. 19, 2013, all of which are hereby incorporated by reference in their entireties. The flame-blocking filters described in the present application may be used to protect particular components of any of these systems.

Figure 5:
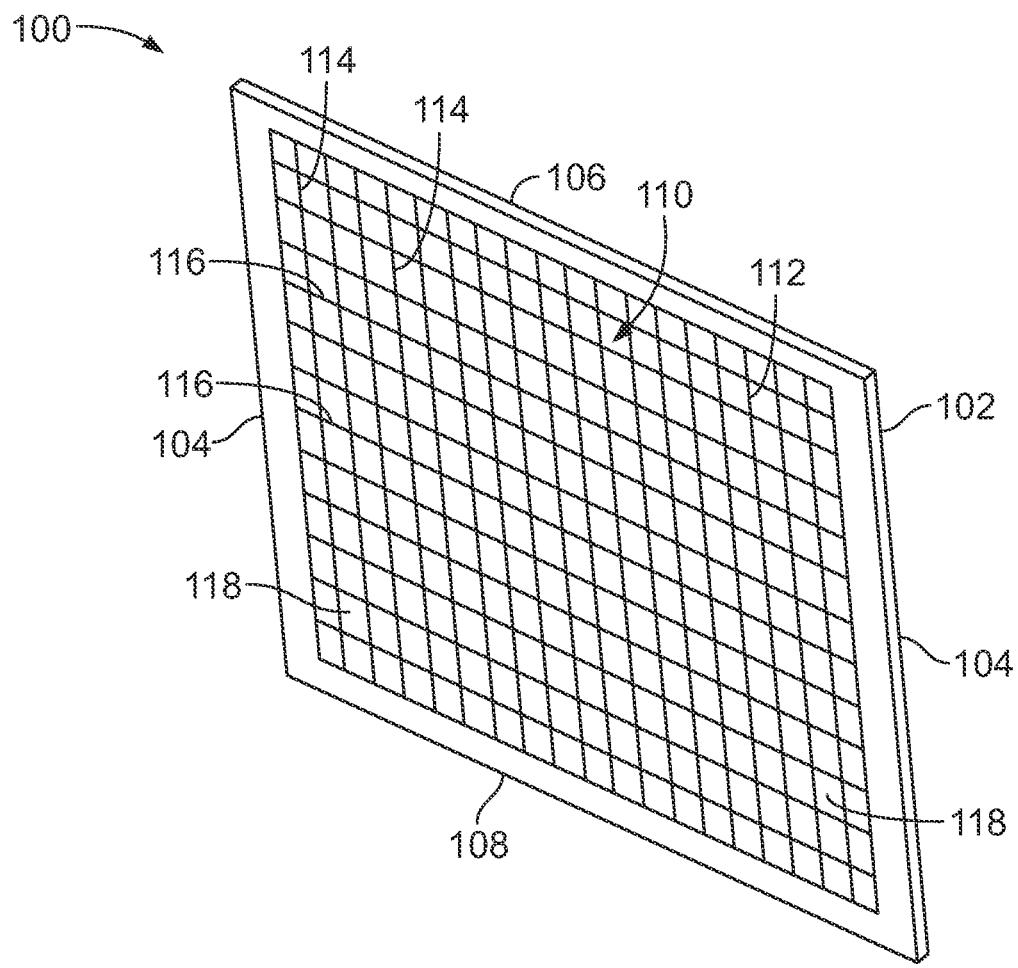
FIG. 5 illustrates an isometric front view of a flame-blocking filter, according to an embodiment of the present disclosure.

FIG. 5 illustrates an isometric front view of a flame-blocking filter 100, according to an embodiment of the present disclosure. The flame blocking filter 100 may be used as any of the flame-blocking filters described above with respect to FIGS. 1-4. The flame-blocking filter 100 includes an outer frame 102 having lateral beams 104 connected to upper and lower beams 106 and 108, respectively. An internal air opening 110 is defined between the lateral beams 104 and the upper and lower beams 106 and 108. The outer frame 102 secures an intumescent filter member 112 within the internal opening 110. The intumescent filter member 112 may be a mesh, grid, lattice, or the like including a plurality of columns 114, such as cylinders, wires, beams, or the like, connected to perpendicular rows 116, such as cylinders, wires, beams, or the like. The columns 114 and rows 116 intersect to form a plurality of air passages 118. In general, the intumescent filter member 112 may include any structure that defines one or more openings, pores, passages, or the like. In at least one embodiment, the intumescent filter member 112 may be formed of a porous foam that is formed of, or coated with, an intumescent material.

The intumescent filter member 112 may be formed having a porous structure, as described above. In an inactive non-heated state, a substantial majority of the intumescent filter member 112 may be open. The percentage of the intumescent filter member 112 that may be open as compared to the closed surface area affects the airflow pressure drop across the intumescent filter member 112. Embodiments of the present disclosure may utilize different intumescent filter members having different shapes and various percentages of open-to-closed surface area based on an amount of airflow pressure drop that it is desired or can be tolerated.

The intumescent filter member 112 may be formed of an intumescent material. Alternatively, the intumescent filter member 112 may be formed of plastic, metal, or the like, and coated or painted with an intumescent coating or paint. For example, the intumescent filter member 112 may include a plastic, metal, or composite screen that is dipped into a container of intumescent coating, rolled with an intumescent paint, sprayed with an intumescent spray, or the like. Additionally, the outer frame 102 may be formed of an intumescent material, or, alternatively, coated or painted with an intumescent coating or paint.

As noted above, during normal operating temperatures, the air passages 118 remain open and allow air to pass therethrough. However, when exposed to excessive temperature (such as exceeding 150° F.) and/or direct flame, the intumescent filter member 112 swells and/or chars, thereby expanding into the air passages 118 and ultimately closing the air passages 118. In this manner, the intumescent filter member 112 allows air to pass therethrough under normal operating conditions, but filters and blocks fire from passing therethrough. The intumescent filter member 112 filters air at excessive temperatures by preventing the air (or flames) from passing therethrough.

The intumescent filter member 112 may be configured to produce a soft or light char, which may be a poor conductor of heat, thus retarding heat transfer. The intumescent filter member 112 may contain hydrates. As the hydrates are spent, water vapor is released, which has a cooling effect. Once the water is spent, the insulation characteristics of the char that remains can slow down heat transfer from the exposed side to the unexposed side of an assembly. Alternatively, the intumescent filter member 112 may be configured to product a hard char, and may contain sodium silicates and graphite, for example. As compared to a soft char, a hard char is capable of exerting quantifiable expansion pressure. In general, the intumescent filter member 112 may be formed of, coated, or painted with any intumescent material.

The outer frame 102 is configured to be removably and adjustably secured within a channel, such as a conduit, plenum, duct, or the like. The outer frame 102 may be sized and shaped to conform to the shape of the channel. For example, if the channel is rectangular, the outer frame 102 may be rectangular. If the channel is elliptical, the outer frame 102 may be elliptical. The outer frame 102 may be configured to securely fit within the channel through a press fit or an interference fit, for example. Optionally, at least portion of the outer frame 102 may be outwardly spring-biased so that the outer frame may be compressively secured within the channel. Alternatively, the outer frame 102 may include features, such as ridges, recesses, or the like, that are configured to removably secure to reciprocal features within the channel. For example, the outer frame 102 may include tabs and/or slots that are configured to be slidably connected to a track formed within the channel.

The outer frame 102 is configured to allow the flame-blocking filter 100 to slide in and out of the channel quickly and easily. Alternatively, the flame-blocking filter 100 may not include the outer frame 102.

Figure 6:
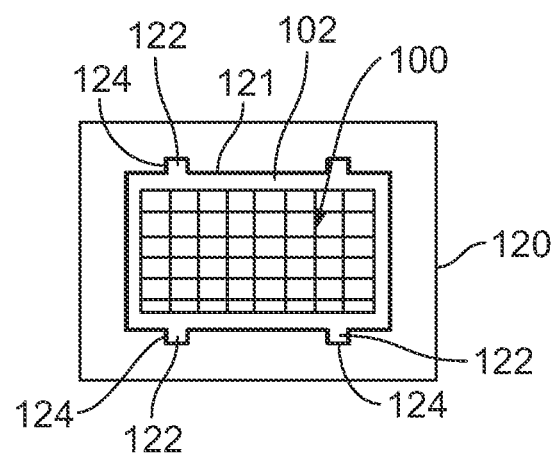
FIG. 6 illustrates a front view of a flame-blocking filter removably and adjustably secured within a channel, according to an embodiment of the present disclosure.

FIG. 6 illustrates a front view of the flame-blocking filter 100 removably and adjustably secured within a channel 120, according to an embodiment of the present disclosure. The outer frame 102 may include outwardly-extending tabs 122 that are received and slidably retained within tracks 124, such as recesses, formed in interior surfaces 121 of the channel 120 that define an air passage. The tracks 124 may longitudinally extend over at least a portion of the length of the channel 120. As such, the flame-blocking filter 100 may be slid back and forth through the channel 120. The channel 120 may include more or less tracks 124 than shown, and the outer frame 102 may include more or less tabs 122 than shown. Alternatively, the tracks 124 may be outwardly extending ridges, while the outer frame 102 may include slots that receive the ridges. While not shown in FIG. 6, one or both of the channel 120 and the flame-blocking filter 100 may include locking members, such as clasps, clamps, latches, or the like, that are configured to secure the flame-blocking filter 100 in a desired position within the channel 120.

Also, alternatively, instead of the tabs 122, the outer frame 102 may include wheels or rollers configured to be slidably received within recesses formed within the channel 120, or vice versa. The wheels or rollers may include braking members configured to prevent the wheels or rollers from rotating.

Also, alternatively, instead of the tabs 122, the outer frame 102 may include spring members that are configured to be compressed. While in the channel, the spring members exert a resistive force into the interior surface 121 of the channel that secures the flame-blocking filter 100 in position.

Figure 7:
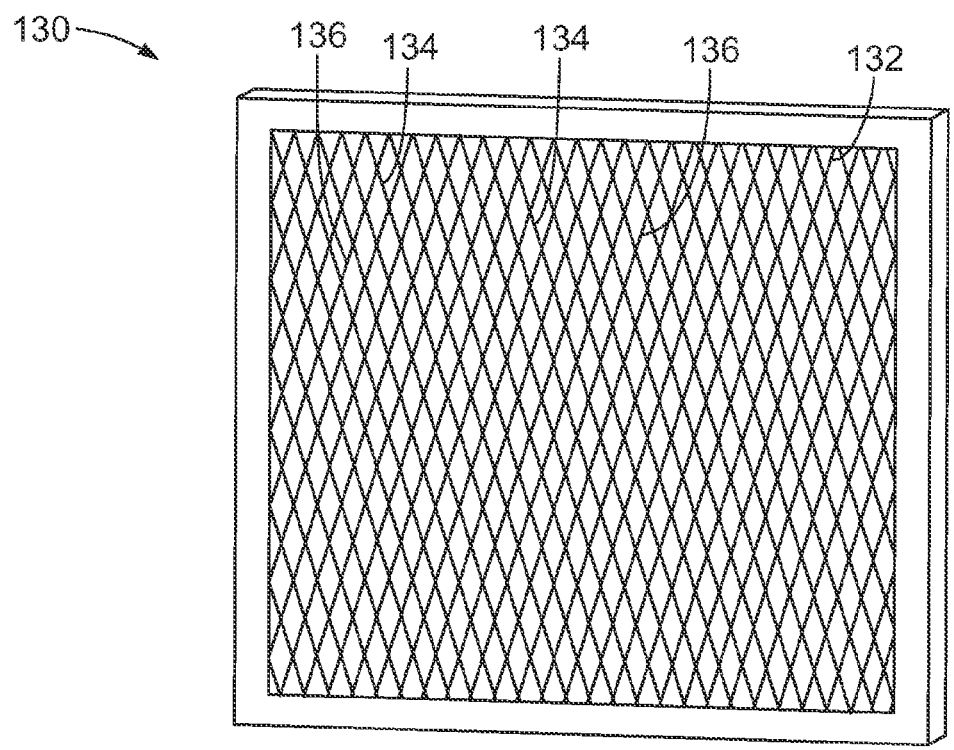
FIG. 7 illustrates a front view of a flame-blocking filter, according to an embodiment of the present disclosure.

FIG. 7 illustrates a front view of a flame-blocking filter 130, according to an embodiment of the present disclosure. The flame-blocking filter 130 is similar to the flame-blocking filter 100, except that the intumescent filter member 132 includes a plurality of first beams 134 oriented in a first diagonal direction that intersection a plurality of second beams 136 oriented in a second diagonal direction that differs from the first diagonal direction. The beams 134 intersect with the beams 136 forming diamond-shape air passages 138 therebetween.

Figure 8:
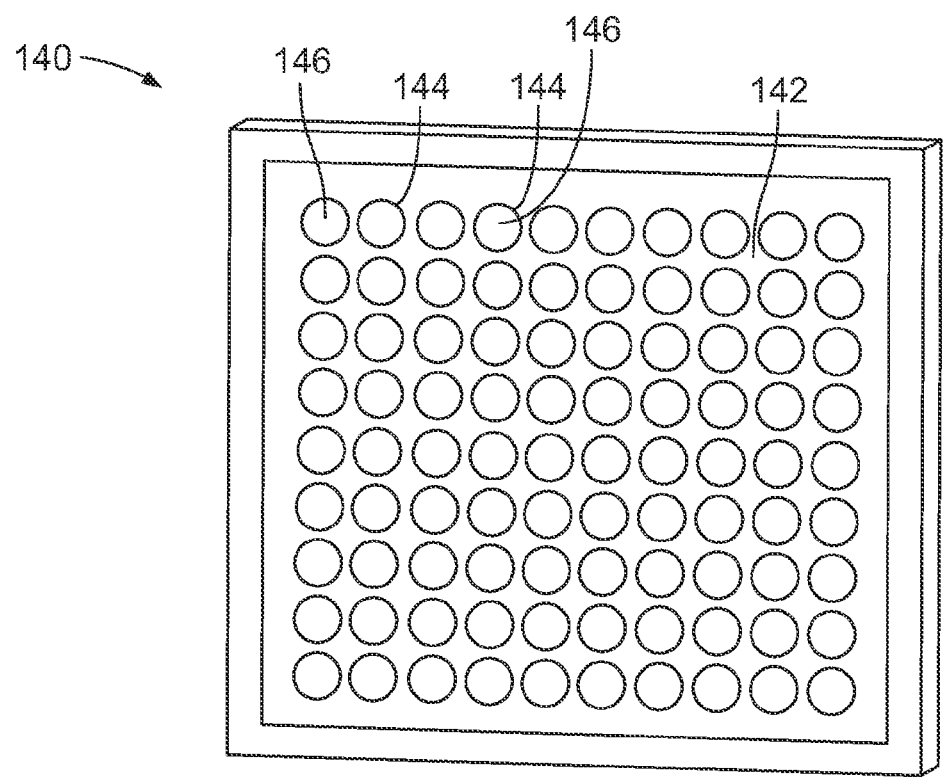
FIG. 8 illustrates a front view of a flame-blocking filter, according to an embodiment of the present disclosure.

FIG. 8 illustrates a front view of a flame-blocking filter 140, according to an embodiment of the present disclosure. The flame-blocking filter 140 is similar to the flame-blocking filter 100, except that the intumescent filter member 142 includes an intumescent sheet or panel having a plurality of openings 144, such as circular openings, that form the air passages 146.

Figure 9:
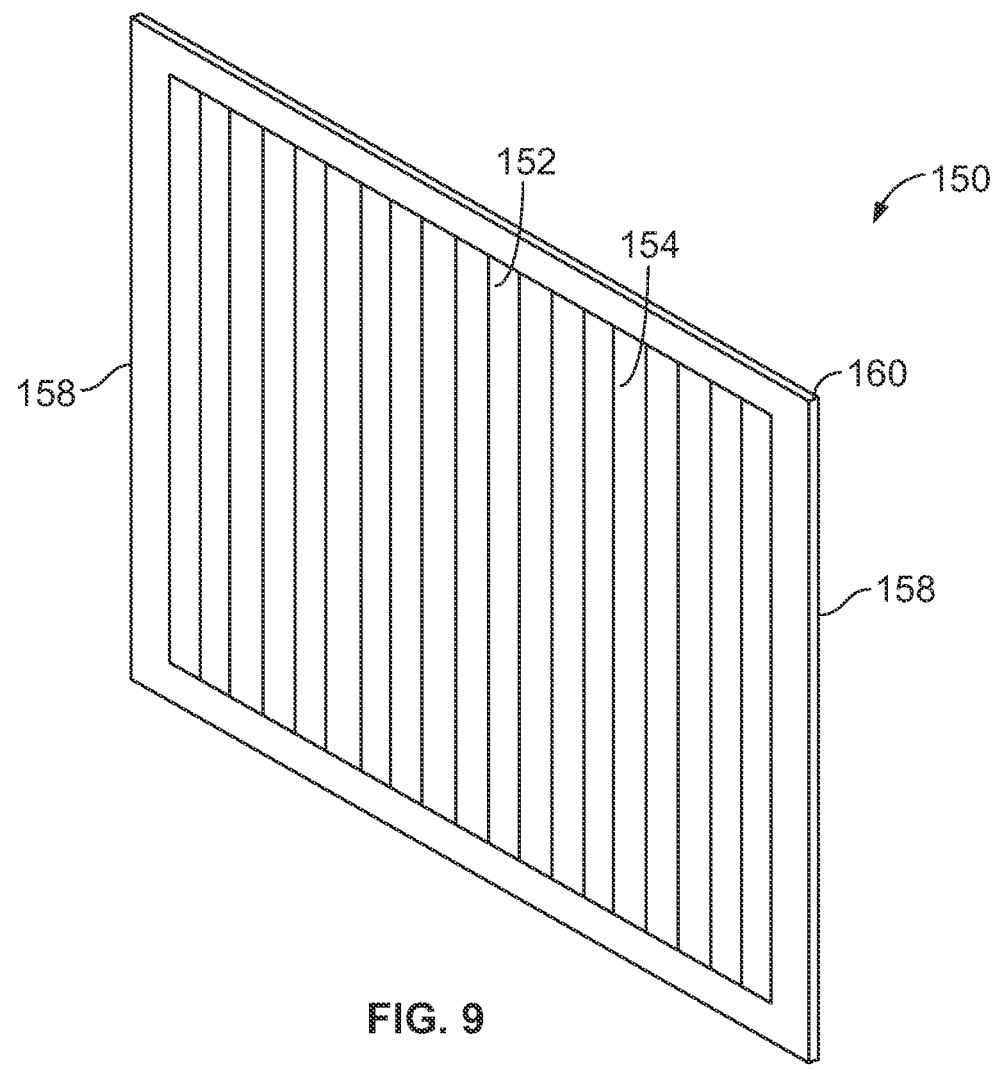
FIG. 9 illustrates an isometric front view of a flame-blocking filter, according to embodiment of the present disclosure.
Figure 10:
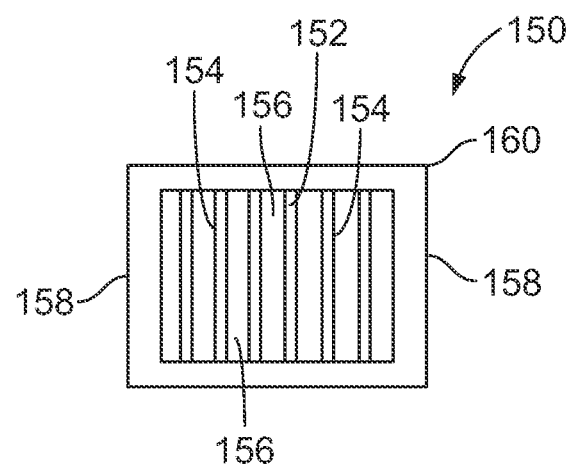
FIG. 10 illustrates a front view of a flame-blocking filter, according to an embodiment of the present disclosure.

FIG. 9 illustrates an isometric front view of a flame-blocking filter 150, according to embodiment of the present disclosure. FIG. 10 illustrates a front view of the flame-blocking filter 150. Referring to FIGS. 9 and 10, the flame-blocking filter 150 is similar to the flame-blocking filter 100, except that the intumescent filter member 152 includes a plurality of linear panels 154 separated by air passages 156. The panels 154 may be parallel with the lateral beams 158 of the outer frame 160.

Figure 11:
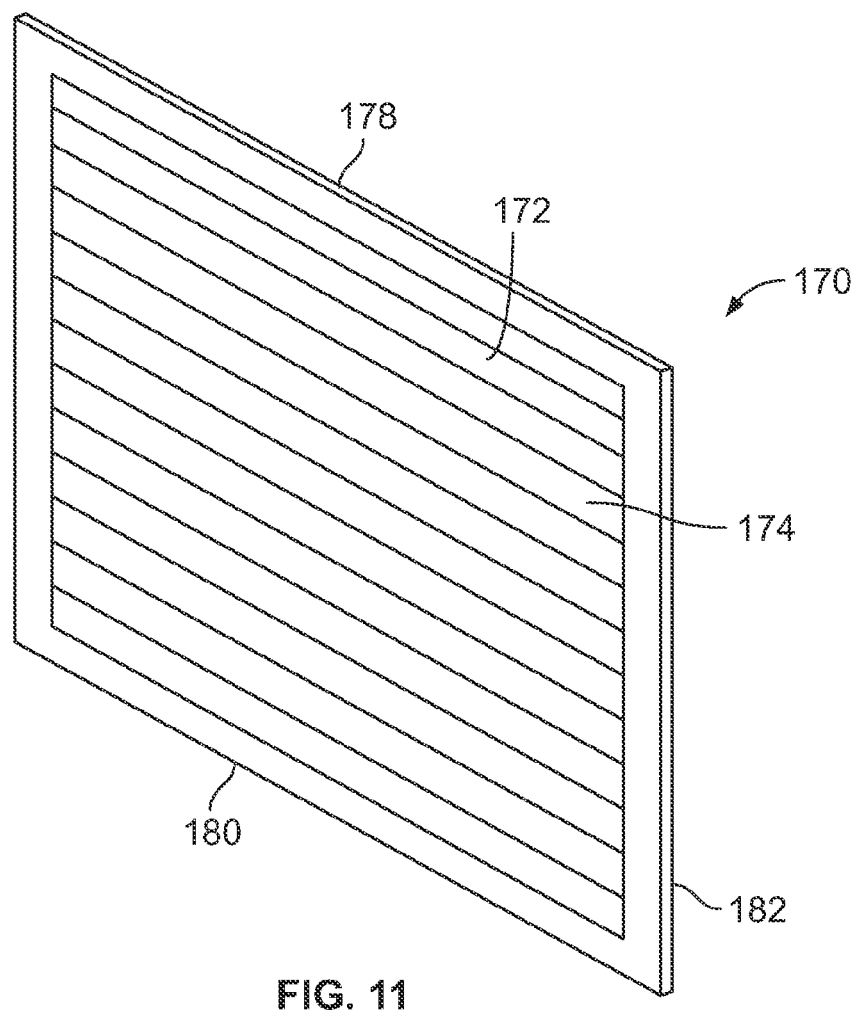
FIG. 11 illustrates an isometric front view of a flame-blocking filter, according to embodiment of the present disclosure.
Figure 12:
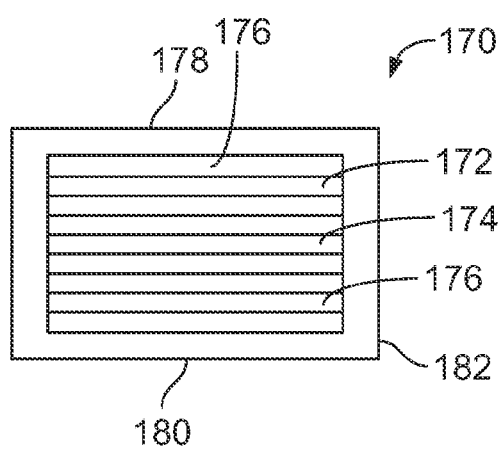
FIG. 12 illustrates a front view of a flame-blocking filter, according to an embodiment of the present disclosure.

FIG. 11 illustrates an isometric front view of a flame-blocking filter 170, according to embodiment of the present disclosure. FIG. 12 illustrates a front view of the flame-blocking filter 170. Referring to FIGS. 11 and 12, the flame-blocking filter 170 is similar to the flame-blocking filter 100, except that the intumescent filter member 172 includes a plurality of linear panels 174 separated by air passages 176. The panels 174 may be parallel with the upper and lower beams 178 and 180, respectively, of the outer frame 182.

Figure 13:
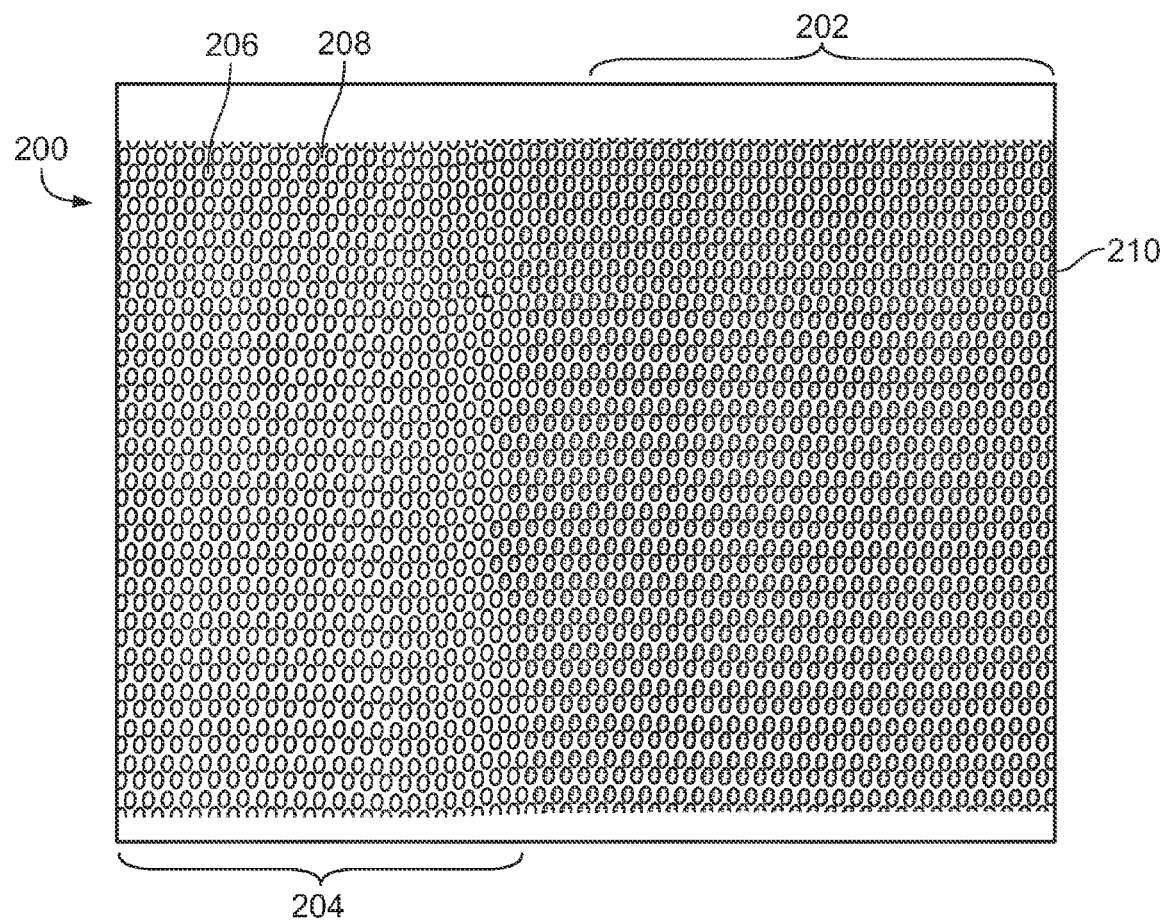
FIG. 13 illustrates a front view of an intumescent filter member having a portion that has been exposed to flame, according to an embodiment of the present disclosure.

FIG. 13 illustrates a front view of an intumescent filter member 200 having a portion 202 that has been exposed to flame, according to an embodiment of the present disclosure. A portion 204 of the intumescent filter member 200 has not been exposed to flame. As such, the portion 204 includes a plurality of air passages 206 that are open between intumescent beams 208. However, the portion 202 that has been exposed to flames includes a char 210 that has expanded and closed air passages. As such, air is unable to pass through the portion 202.

In at least one embodiment, intumescent filter member panels may be pivotally secured, for example, within a frame. The panels may form a damper. The intumescent filter member panels may be configured to be selectively rotated or otherwise actuated between open and closed positions. For example, the intumescent filter damper may be actuated based on smoke detection, heat detection, power failure, and the like.

Referring to FIGS. 1-13, embodiments of the present disclosure provide flame-blocking filters that may include intumescent filter members that are configured to be removably and adjustably secured within channels of an air delivery system. The flame-blocking filters are configured to isolate components within the air delivery system from fire and excessive heat. When subjected to high temperatures (such as exceeding 150° F.) and/or direct flame, the intumescent filter members expand to several times their original sizes, such as with respect to thickness and/or width. In at least some embodiments, the intumescent filter members may expand upwards of 100× their initial volume. The intumescent filter members are flame-resistant and form a char barrier to the flame.

By forming or coating the flame-blocking filters with intumescent material, the expansion of the intumescent filter members block open areas within the flame-blocking filters, thereby forming a solid barrier to the flame. As such, the flame and airflow are prevented from passing therethrough.

In contrast to components, such as heat exchangers, that may include intumescent screens integrally formed therewith, embodiments of the present disclosure provide removable and adjustable flame-blocking filters that are separate and distinct from the components. As such, an air gap may be defined between the components and the flame-blocking filters. The air gap dissipates any heat that would otherwise be directly translated from the intumescent material to the component. Additionally, incorporating a flame-retardant screen directly onto a component generates an additional airflow pressure drop in relation to the component, which may adversely affect the component during a performance certification test, such as a test in relation to AHRI Standard 1060. By separating the flame-blocking filters from the components, the components may be tested without experiencing any additional airflow pressure drops.

Embodiments of the present disclosure provide separate and distinct flame-blocking filters that may be removably and adjustably secured within channels of an air delivery system. As such, the flame-blocking filters may be placed anywhere within the air delivery system and isolate any internal components of the air delivery system from fire and high temperatures. Further, a separation distance may be set between the flame-blocking filters and the components to be protected, so that both convective and conductive heat transfer between the flame-blocking filters and the components are reduced. Further, existing air delivery systems may be retrofit with the flame-blocking filters, thereby allowing building owners to upgrade their air delivery systems to meet the latest fire safety codes without the need to replace the entire air delivery systems.

In at least one embodiment of the present disclosure, a flame-blocking filter includes a frame defining an air passage plane oriented to traverse an air channel such that air flows through the air passage plane during normal operation of the system. An intumescent filter member, such as a mesh screen formed of, or coated with, an intumescent material is secured to the frame. The mesh screen may include beams or ribs crossing the air passage plane in at least one direction. The beams or ribs may be spaced apart to provide an open surface area through the screen for air to flow through the screen during normal operating conditions. The intumescent material has a first thickness when in an inactive non-heated state. The intumescent material is configured to expand to a greater second thickness when in an active heated state. The intumescent material is configured to substantially close the open surface area of the screen when in the active heated state.

In accordance with embodiments of the present disclosure, the fire-blocking filters are configured to isolate both flammable components, and also isolate components that are at the highest risk of causing a fire (such as motors).

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. An air delivery system configured to deliver air to an enclosed structure, the air delivery system comprising:
    a housing having at least one air channel for delivering or receiving air from the enclosed structure;
    an energy exchanger disposed within the at least one air channel, the energy exchanger being configured to condition a return air stream from the enclosed structure using an outdoor air stream;
    a return air inlet channel upstream of the energy exchanger and configured to receive and direct the return air stream through the energy exchanger;
    a supply air outlet channel downstream of the energy exchanger and configured to outlet the conditioned air stream as supply air to the enclosed structure;
    an outside air inlet channel upstream of the energy exchanger and configured to receive and direct an outdoor air stream through the energy exchanger;
    an exhaust air outlet channel downstream of the energy exchanger and configured to outlet the outdoor air to an exterior of the housing as hot exhaust air; and
    at least one flame-blocking filter disposed within the at least one air channel and separated from the energy exchanger by a distance, the flame-blocking filter comprising:
        an outer frame configured to be removably and adjustably inserted into the at least one channel of the air delivery system, the outer frame defining an air opening such that air flows through the air opening during normal operation of the air delivery system; and
        an intumescent filter member secured to the outer frame and having a plurality of air passages configured to allow air to flow therethrough during the normal operation of the air delivery system, wherein at least a portion of the distance between the at least one flame-blocking filter and the energy exchanger is void of any additional components and defines an open air space, wherein the intumescent filter member has a first thickness when in an inactive non-heated state, wherein the intumescent material is configured to expand to a greater second thickness when in an active heated state, and wherein the intumescent material closes the plurality of air passages when in the active heated state.

2. The air delivery system of claim 1, wherein the intumescent filter member comprises one or more of a mesh, grid, lattice, one or more sheets, one or more panels, or foam material.

3. The air delivery system of claim 1, wherein the intumescent filter member has beams crossing the air opening in at least one direction, the beams spaced apart and arranged in one of a horizontal alignment, a vertical alignment, a checker pattern, or a mesh.

4. The air delivery system of claim 1, wherein each of the plurality of air passages is shaped as a rectangle, square, circle, oval, hexagon, or polygon.

5. The air delivery system of claim 1, wherein the outer frame includes one or more features configured to be slidably retained by at least one track of the air delivery system.

6. The air delivery system of claim 1, further comprising: an air filter disposed within the at least one air channel, wherein the at least one flame-blocking filter is arranged between the air filter and the energy exchanger.

7. The air delivery system of claim 1, wherein the at least one flame-blocking filter comprises:
   a first flame-blocking filter disposed within the return air inlet channel; and
   a second flame-blocking filter disposed within the outside air inlet channel.

8. The air delivery system of claim 7, wherein the at least one flame-blocking filter further comprises:
   a third flame-blocking filter disposed within the supply air outlet channel; and
   a fourth flame-blocking filter disposed within the exhaust air outlet channel.

9. The air delivery system of claim 1, wherein the at least one flame blocking filter is adjustably secured within an interior of the housing and is adjustable between a first position and a second position, wherein the flame-blocking filter is essentially out of an air flow path of air circulating through the at least one air channel in the first position and the flame blocking filter is inserted into the air flow path in the second position.

* * * * *

UNITED STATES PATENT AND TRADEMARK OFFICE
CERTIFICATE OF CORRECTION

PATENT NO. : 9,901,760 B2  
APPLICATION NO. : 14/047497  
DATED : February 27, 2018  
INVENTOR(S) : Erb et al.

Page 1 of 1

It is certified that error appears in the above-identified patent and that said Letters Patent is hereby corrected as shown below:

In the Claims

In Column 13, Line 22, in Claim 9, delete "flame blocking" and insert --flame-blocking-- therefor In Column 13, Line 27, in Claim 9, delete "flame blocking" and insert --flame-blocking-- therefor Signed and Sealed this  
Eighth Day of December, 2020

Andrei Iancu  
*Director of the United States Patent and Trademark Office*